US010989069B2

(12) United States Patent
Matsumura et al.

(10) Patent No.: US 10,989,069 B2
(45) Date of Patent: Apr. 27, 2021

(54) STEAM TURBINE COOLING UNIT

(71) Applicant: Mitsubishi Hitachi Power Systems, Ltd., Kanagawa (JP)

(72) Inventors: Takumi Matsumura, Tokyo (JP); Toyoharu Nishikawa, Tokyo (JP); Katsuhisa Hamada, Kanagawa (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 312 days.

(21) Appl. No.: 16/063,436

(22) PCT Filed: Nov. 17, 2016

(86) PCT No.: PCT/JP2016/084085
§ 371 (c)(1),
(2) Date: Jun. 18, 2018

(87) PCT Pub. No.: WO2017/110322
PCT Pub. Date: Jun. 29, 2017

(65) Prior Publication Data
US 2019/0003334 A1 Jan. 3, 2019

(30) Foreign Application Priority Data

Dec. 24, 2015 (JP) .............................. JP2015-252488

(51) Int. Cl.
*F01D 25/12* (2006.01)
*F01D 25/24* (2006.01)
(Continued)

(52) U.S. Cl.
CPC ............... *F01D 25/12* (2013.01); *F01D 9/02* (2013.01); *F01D 9/06* (2013.01); *F01D 25/24* (2013.01);
(Continued)

(58) Field of Classification Search
CPC .......... F01D 25/12; F01D 25/14; F01D 25/24; F01D 25/26; F01D 5/08; F01D 9/02;
(Continued)

(56) References Cited

U.S. PATENT DOCUMENTS 6,568,902 B2 * 5/2003 Aschenbruck .......... F01D 9/023
415/116
8,393,861 B2   3/2013 Wada et al.
(Continued)

FOREIGN PATENT DOCUMENTS

| JP | 58-174106 | 10/1983 |
|----|-----------|---------|
| JP | 2006-104951 | 4/2006 |
| JP | 2014-37825 | 2/2014 |

OTHER PUBLICATIONS

International Search Report dated Jan. 24, 2017 in International (PCT) Application No. PCT/JP2016/084085.
(Continued)

*Primary Examiner* — Brian P Wolcott
*Assistant Examiner* — Justin A Pruitt
(74) *Attorney, Agent, or Firm* — Wenderoth, Lind & Ponack, L.L.P.

(57) ABSTRACT

A steam turbine cooling unit for a steam turbine includes a coolant steam path provided to penetrate a casing along a superheated steam supply tube to reach a gap; and a coolant steam supplying unit configured to supply coolant steam flowing through the coolant steam path along the superheated steam supply tube to reach the gap, and having: (i) a pressure higher than a pressure of superheated steam to be supplied by the superheated steam supply tube; and (ii) a temperature lower than a temperature of the superheated steam to be supplied by the superheated steam supply tube.

2 Claims, 3 Drawing Sheets

(51) Int. Cl.
*F01D 9/02* (2006.01)
*F01D 9/06* (2006.01)

(52) U.S. Cl.
CPC ...... *F05D 2220/31* (2013.01); *F05D 2240/10* (2013.01); *F05D 2260/201* (2013.01); *F05D 2260/2322* (2013.01); *Y02T 50/60* (2013.01)

(58) Field of Classification Search
CPC ........ F01D 9/06; Y02T 50/675; Y02T 50/676; F05D 2220/31; F05D 2240/10; F05D 2260/201; F05D 2260/2322
USPC ......................................................... 415/175
See application file for complete search history.

(56) References Cited

U.S. PATENT DOCUMENTS

| | | | |
|---|---|---|---|
| 2003/0097841 A1* | 5/2003 | Endries | .................. F02C 7/141 60/671 |
| 2015/0121898 A1* | 5/2015 | Tashima | .................. F02C 3/34 60/806 |

OTHER PUBLICATIONS

Written Opinion of the International Search Authority dated Jan. 24, 2017 in International (PCT) Application No. PCT/JP2016/084085, with English translation.

* cited by examiner

STEAM TURBINE COOLING UNIT

FIELD

The present invention relates to a steam turbine cooling unit.

BACKGROUND

Conventionally, for example, the steam turbine disclosed in Japanese Unexamined Patent Application No. 2006-104951 aims to improve the thermal efficiency of a plant by bringing the temperature of steam to an ultra-high temperature, while maintaining the strength of the turbine components high by enabling the turbine components to accommodate with the ultra-high temperature steam. This steam turbine has a turbine stage that is provided on a turbine rotor that is housed in a double casing, and a nozzle box for guiding the working steam from a steam supply tube to the turbine stage. This steam turbine includes a coolant steam inlet that is provided between the turbine rotor and the nozzle box to penetrate the double casing; a unit for branching the coolant steam supplied from the coolant steam inlet, for enabling one of the branched flows of coolant steam to cool the external of the nozzle box, and then supplying the coolant steam to the turbine stage, the turbine rotor, and the double casing; and a unit for merging the other branched flow of coolant steam with the flow of the coolant steam having cooled the double casing, via a gland provided between the double casing and the turbine rotor, and for supplying the merged coolant steam to the steam supply tube.

SUMMARY

Technical Problem

In the steam turbine disclosed in Japanese Unexamined Patent Application No. 2006-104951, the steam supply tube has a double-tube structure including an outer tube and an inner tube, and a cooling path is formed between the inner tube and the outer tube. In other words, the steam supply tube has a path internal of the inner tube, and a cooling path formed between the inner tube and the outer tube. The internal of the inner tube is connected to the nozzle box that is housed in the inner casing of the double casing, and the cooling path is connected to the internal of an outer casing of the double casing. The ultra-high temperature steam is then supplied from the inner tube into the nozzle box, and the nozzle box guides the steam to the turbine stage in the inner casing. The coolant steam, by contrast, is supplied from the coolant steam inlet into the space between the turbine rotor and the nozzle box, and one of the flows follows external of the nozzle box, and is supplied to the internals of the turbine stage, the turbine rotor, and the inner casing. The other flow passes through the gland provided between the inner casing and the turbine rotor, and these flows are merged inside of the outer casing, and supplied to the cooling path on the steam supply tube.

In the steam turbine disclosed in the Japanese Unexamined Patent Application No. 2006-104951, however, it is difficult to control the flowrate of the steam supplied to each part, because the coolant steam is branched to one and the other, and is distributed to different parts. As a result, the cooling effect of each part may be insufficient, and the cooling efficiency may deteriorate.

In order to cool a steam turbine, it is necessary to supply steam having a temperature lower than that of the steam to be supplied to drive the steam turbine, and a pressure higher than that of the steam to be supplied to drive the steam turbine. However, the most heated part in the steam turbine rotor is under the highest pressure inside the steam turbine, and therefore, it is not easy to supply the coolant steam having a lower temperature and an even higher pressure. This is because the temperature and the pressure of the steam inside of the steam turbine drop simultaneously.

The present invention is intended to solve the problem described above, and an object of the present invention is to provide a steam turbine cooling unit capable of improving the cooling efficiency.

Solution to Problem

To achieve the object described above, a steam turbine cooling unit of the present invention is for a steam turbine that includes a rotor which is a rotating body extending along an axial center of rotations of the rotor, a casing configured to house the rotor, a steam path provided between the rotor and the casing in an extending direction of the rotor, a steam nozzle unit attached to the casing with a gap formed between an outer surface of the steam nozzle unit and an outer circumferential surface of the rotor, the gap having an annular shape surrounding the outer circumference of the rotor and communicating with the steam path, the steam nozzle unit including a steam nozzle chamber having an annular shape formed along internal of the steam nozzle unit and an opening facing the extending direction of the rotor from the steam nozzle chamber to communicate with the steam path, and a superheated steam supply tube to which superheated steam is supplied, the superheated steam supply tube being provided to penetrate the casing from external of the casing to communicate with the steam nozzle chamber in the steam nozzle unit. The steam turbine cooling unit includes a coolant steam path provided to penetrate the casing along the superheated steam supply tube to reach the gap; and a coolant steam supplying unit configured to supply coolant steam flowing through the coolant steam path along the superheated steam supply tube to reach the gap, the coolant steam having a pressure higher than and a temperature lower than steam to be supplied by the superheated steam supply tube.

With this steam turbine cooling unit, the superheated steam supplied by the superheated steam supply tube flows out of the steam nozzle chamber in the steam nozzle unit, passes through the opening, and reaches the steam path. The temperature and the pressure of the superheated steam drop gradually from the upstream toward the downstream of this steam flow. By contrast, the coolant steam flows through the coolant steam path along the superheated steam supply tube, and reaches the gap, that is, flows from a high-temperature section toward a low-temperature section, in a manner following the temperature of the superheated steam. Therefore, the coolant steam can cool the high-temperature section more reliably. In addition, because the coolant steam flowing out of the gap and reaching the steam path is heated to a temperature near the temperature of the superheated steam, and is merged with the superheated steam, a reduction in the performance of the steam turbine can be suppressed. In addition, because the coolant steam follows a continuous channel without being distributed to a plurality of channels, the flowrate can be controlled easily in the process of cooling.

Furthermore, in the steam turbine cooling unit of the present invention, the coolant steam path is a space formed between an outer circumferential surface of the superheated steam supply tube and an outer tube attached to the casing to surround the outer circumference of the superheated steam supply tube. The coolant steam path is provided to extend from external of the casing to internal of the casing to communicate with the gap.

With this steam turbine cooling unit, a channel penetrating the casing along the superheated steam supply tube and reaching the gap can be achieved.

Furthermore, in the steam turbine cooling unit of the present invention, the coolant steam path includes a space formed between an outer circumferential surface of the superheated steam supply tube and the casing, a cavity provided inside of a wall of the steam nozzle unit to communicate with the space, and a penetrating hole penetrating from the cavity into the gap. The coolant steam path is provided to extend from external of the casing to internal of the casing to communicate with the gap.

With this steam turbine cooling unit, a channel penetrating the casing along the superheated steam supply tube and reaching the gap can be achieved.

Advantageous Effects of Invention

According to the present invention, the cooling efficiency can be improved.

DESCRIPTION OF EMBODIMENTS

An embodiment according to the present invention will now be explained in detail with reference to some drawings. This embodiment is, however, not intended to limit the scope of the present invention in any way. Elements described in the embodiment include those that can be easily replaced by those skilled in the art, and those that are substantially the same.

Figure 1:
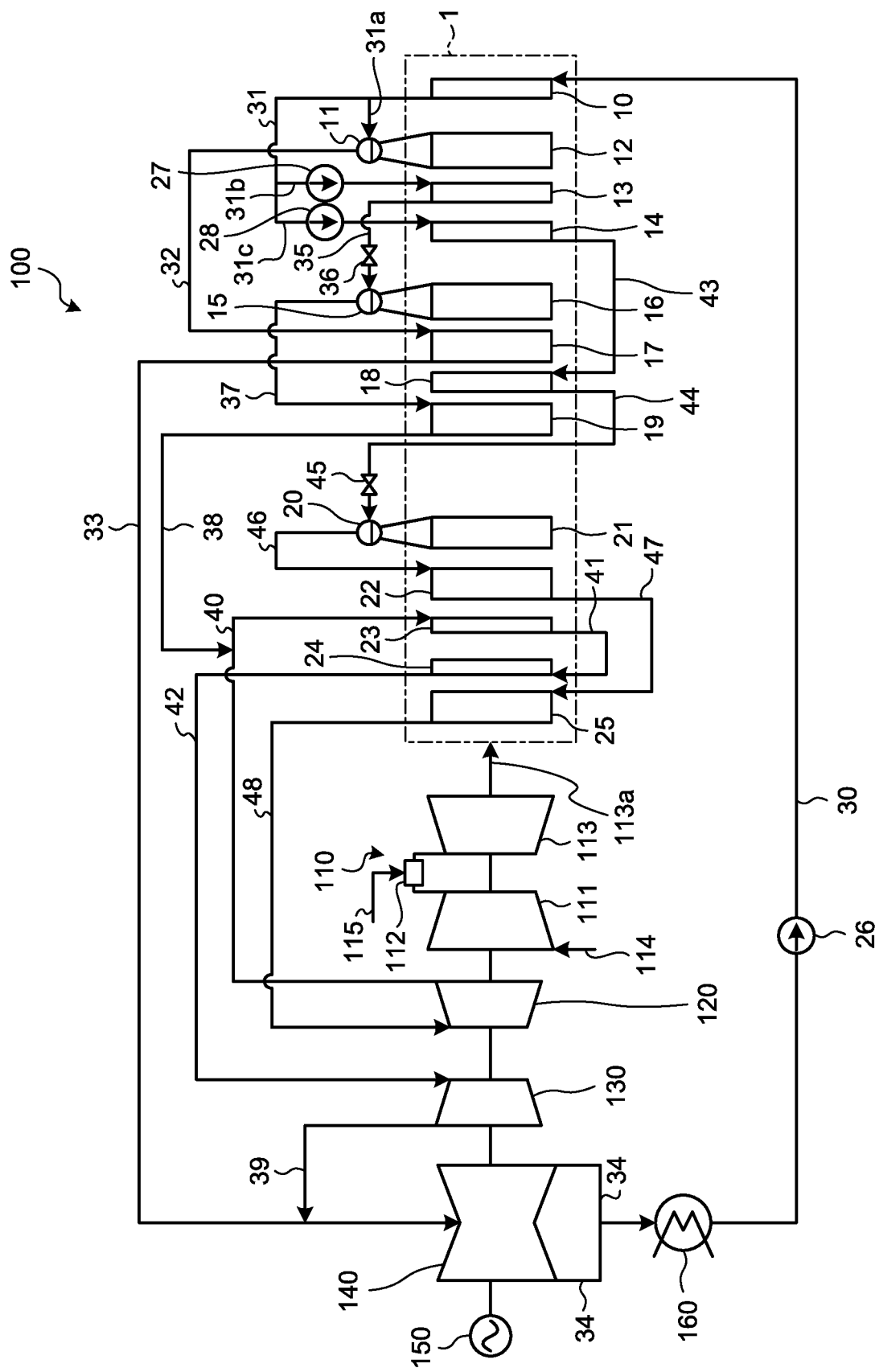
FIG. 1 is a general schematic illustrating an exemplary configuration of a combined-cycle plant.

A steam turbine cooling unit according to the embodiment finds its application as a rotating machine in a gas turbine or a steam turbine, for example. FIG. 1 is a general schematic illustrating an exemplary configuration of a combined-cycle plant in which a gas turbine and a steam turbine are used. This combined-cycle plant 100 illustrated in FIG. 1 includes a gas turbine 110, a high-pressure steam turbine 120, a medium-pressure steam turbine 130, and a low-pressure steam turbine 140. The gas turbine 110, the high-pressure steam turbine 120, the medium-pressure steam turbine 130, and the low-pressure steam turbine 140 are arranged coaxially with a generator 150.

The gas turbine 110 includes a compressor 111, a combustor 112, and a turbine 113. The compressor 111 compresses incoming compressor air 114, and supplies the compressed air to the combustor 112. The combustor 112 generates high-temperature combustion gas from the supplied air and fuel 115, and supplies the combustion gas to the turbine 113. The combustion gas passing through the turbine 113 drives the turbine 113 in rotation, and is discharged as flue gas.

The combined-cycle plant 100 is provided with a steam generator (heat recovery steam generator) 1 that generates superheated steam from water, using the flue gas discharged from the turbine 113 in the gas turbine 110 as a heat source. The superheated steam generated by the steam generator 1 drives the high-pressure steam turbine 120, the medium-pressure steam turbine 130, and the low-pressure steam turbine 140. The generator 150 generates power, by driving the gas turbine 110, the high-pressure steam turbine 120, the medium-pressure steam turbine 130, and the low-pressure steam turbine 140. The steam used in the low-pressure steam turbine 140 is condensed by a condenser 160 that is connected to the low-pressure steam turbine 140, and is sent to the steam generator 1 as water for generating the superheated steam.

The steam generator 1 is connected to a flue gas duct 113a that is provided on the exhaust side of the turbine 113 in the gas turbine 110. The steam generator 1 includes, sequentially from the downstream side of the flue gas flow, a low-pressure economizer 10, a low-pressure drum 11, a low-pressure evaporator 12, a medium-pressure economizer 13, a primary high-pressure economizer 14, a medium-pressure drum 15, a medium-pressure evaporator 16, a low-pressure superheater 17, a secondary high-pressure economizer 18, a medium-pressure superheater 19, a high-pressure drum 20, a high-pressure evaporator 21, a primary high-pressure superheater 22, a primary reheater 23, a secondary reheater 24, and a secondary high-pressure superheater 25, and also includes a condensate pump 26, a medium-pressure feedwater pump 27, and a high-pressure feedwater pump 28.

This steam generator 1 has a low-pressure system for generating low-pressure superheated steam for driving the low-pressure steam turbine 140, a medium-pressure system for generating medium-pressure superheated steam for driving the medium-pressure steam turbine 130, and a high-pressure system for generating high-pressure superheated steam for driving the high-pressure steam turbine 120. The low-pressure system includes the low-pressure economizer 10, the low-pressure drum 11, the low-pressure evaporator 12, the low-pressure superheater 17, and the condensate pump 26. The medium-pressure system includes the medium-pressure economizer 13, the medium-pressure drum 15, the medium-pressure evaporator 16, the medium-pressure superheater 19, the primary reheater 23, the secondary reheater 24, and the medium-pressure feedwater pump 27. The high-pressure system includes the primary high-pressure economizer 14, the secondary high-pressure economizer 18, the high-pressure drum 20, the high-pressure evaporator 21, the primary high-pressure superheater 22, the secondary high-pressure superheater 25, and the high-pressure feedwater pump 28.

In the low-pressure system, the low-pressure economizer 10 is connected to the condenser 160 via a connection line 30. The condensate pump 26 is provided to the connection line 30. The low-pressure economizer 10 is connected to the low-pressure drum 11 via a low-pressure branch line 31a that is one of the three branches of a connection line 31. The low-pressure drum 11 is connected to the low-pressure evaporator 12. The low-pressure drum 11 is also connected to the low-pressure superheater 17 via a connection line 32. The low-pressure superheater 17 is connected to the incoming side of the low-pressure steam turbine 140 via a connection line 33. The outgoing side of the low-pressure steam turbine 140 is connected to the condenser 160 via a connection line 34.

In other words, in the low-pressure system, the water (condensed water) in the condenser 160 is pumped by the condensate pump 26 into the low-pressure economizer 10 via the connection line 30, heated in the low-pressure economizer 10, and flows into the low-pressure drum 11 via the low-pressure branch line 31a of the connection line 31. The water supplied into the low-pressure drum 11 evaporates inside of the low-pressure evaporator 12, vaporizes to saturated vapor, and the saturated vapor is returned to the low-pressure drum 11, and sent to the low-pressure superheater 17 via the connection line 32. The saturated vapor is superheated in the low-pressure superheater 17, and the resultant superheated steam is supplied to the low-pressure steam turbine 140 via the connection line 33. The steam having driven and discharged from the low-pressure steam turbine 140 is guided into the condenser 160 via the connection line 34, condensed to water (condensed water), and pumped out by the condensate pump 26 into the low-pressure economizer 10 via the connection line 30.

In the medium-pressure system, the medium-pressure economizer 13 is connected to the low-pressure economizer 10 via a medium-pressure branch line 31b that is one of the three branches of the connection line 31. The medium-pressure feedwater pump 27 is provided to the medium-pressure branch line 31b. The medium-pressure economizer 13 is also connected to the medium-pressure drum 15 via a connection line 35. A flow regulator valve 36 is provided to an intermediary point of the connection line 35. The medium-pressure drum 15 is connected to the medium-pressure evaporator 16. The medium-pressure drum 15 is connected to the medium-pressure superheater 19 via a connection line 37. The medium-pressure superheater 19 is connected to the incoming side of the primary reheater 23 via a connection line 38. In the medium-pressure system, the primary reheater 23 is connected to the outgoing side of the high-pressure steam turbine 120 via a connection line 40. The primary reheater 23 is also connected to the secondary reheater 24 via a connection line 41. The secondary reheater 24 is connected to the incoming side of the medium-pressure steam turbine 130 via a connection line 42. The outgoing side of the medium-pressure steam turbine 130 is connected to the incoming side of the low-pressure steam turbine 140 via a connection line 39.

In other words, in the medium-pressure system, the water heated in the low-pressure economizer 10 is pumped by the medium-pressure feedwater pump 27, and flows into the medium-pressure economizer 13 via the medium-pressure branch line 31b of the connection line 31, heated in the medium-pressure economizer 13, and flows into the medium-pressure drum 15 via the connection line 35. The water supplied into the medium-pressure drum 15 evaporates in the medium-pressure evaporator 16, vaporizes to saturated vapor, and the saturated vapor is returned to the medium-pressure drum 15, and sent to the medium-pressure superheater 19 via the connection line 37. The saturated vapor is superheated in the medium-pressure superheater 19, and the resultant superheated steam is supplied to the primary reheater 23 via the connection line 38. In the medium-pressure system, the steam having driven and discharged from the high-pressure steam turbine 120 is sent to the primary reheater 23 via the connection line 40. The steam is superheated in the primary reheater 23, and the resultant superheated steam is sent into the secondary reheater 24 via the connection line 41. The steam is superheated further in the secondary reheater 24, and the resultant superheated steam is supplied to the medium-pressure steam turbine 130 via the connection line 42. The steam having driven and discharged from the medium-pressure steam turbine 130 is supplied to the low-pressure steam turbine 140 via the connection line 39.

Because the primary reheater 23 and the secondary reheater 24 are aimed to superheat steam, the primary reheater 23 and the secondary reheater 24 have the same function, as a superheater, and are included in the scope of the superheater in this embodiment. In other words, the primary reheater 23 is also referred to as a first superheater, and the secondary reheater 24 is referred to as a second superheater.

In the high-pressure system, the primary high-pressure economizer 14 is connected to the low-pressure economizer 10 via a high-pressure branch line 31c that is one of the three branches of the connection line 31. The high-pressure feedwater pump 28 is provided to the high-pressure branch line 31c. The primary high-pressure economizer 14 is connected to the secondary high-pressure economizer 18 via a connection line 43. The secondary high-pressure economizer 18 is connected to the high-pressure drum 20 via a connection line 44. A flow regulator valve 45 is provided to an intermediary point of this connection line 44. The high-pressure drum 20 is connected to the high-pressure evaporator 21. The high-pressure drum 20 is also connected to the primary high-pressure superheater 22 via a connection line 46. The primary high-pressure superheater 22 is connected to the secondary high-pressure superheater 25 via a connection line 47. The secondary high-pressure superheater 25 is connected to the incoming side of the high-pressure steam turbine 120 via a connection line 48. The outgoing side of the high-pressure steam turbine 120 is connected to the primary reheater 23 in the medium-pressure system via the connection line 40, as described above.

In other words, in the high-pressure system, the water heated in the low-pressure economizer 10 is pumped by the high-pressure feedwater pump 28, and flows into the primary high-pressure economizer 14 via the high-pressure branch line 31c of the connection line 31, and is heated further in the primary high-pressure economizer 14. The water then flows into the secondary high-pressure economizer 18 via the connection line 43, is heated in the secondary high-pressure economizer 18, and flows into the high-pressure drum 20 via the connection line 44. The water supplied into the high-pressure drum 20 evaporates in the high-pressure evaporator 21, vaporizes to saturated vapor, and the saturated vapor is returned to the high-pressure drum 20, and is sent to the primary high-pressure superheater 22 via the connection line 46. The saturated vapor is superheated in the primary high-pressure superheater 22, and the resultant superheated steam is sent to the secondary high-pressure superheater 25 via the connection line 47. The superheated steam is superheated further in the secondary high-pressure superheater 25, and the resultant superheated steam is supplied to the high-pressure steam turbine 120 via the connection line 48.

Figure 2:
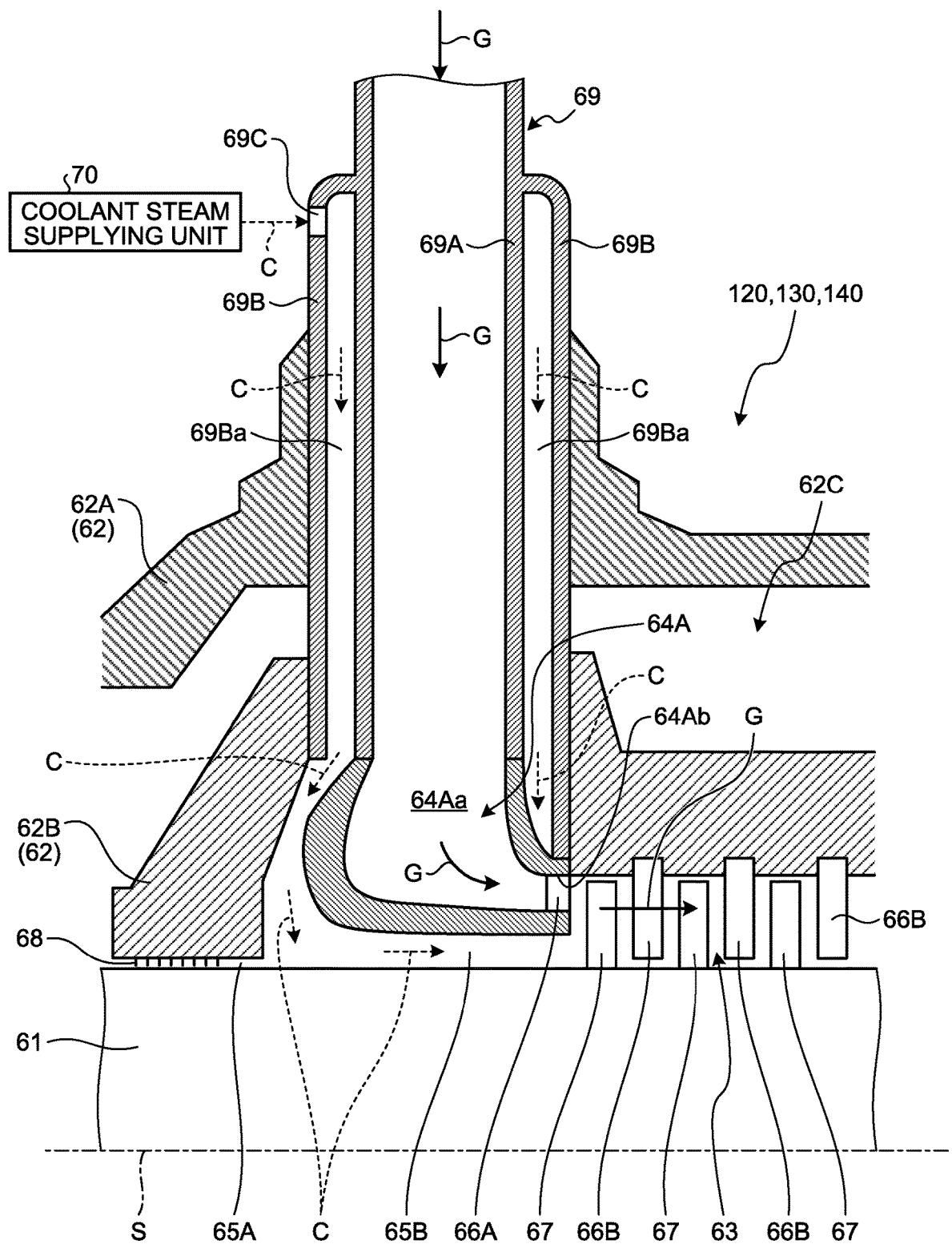
FIG. 2 is a general schematic illustrating an exemplary configuration of a steam turbine cooling unit according to an embodiment of the present invention.
Figure 3:
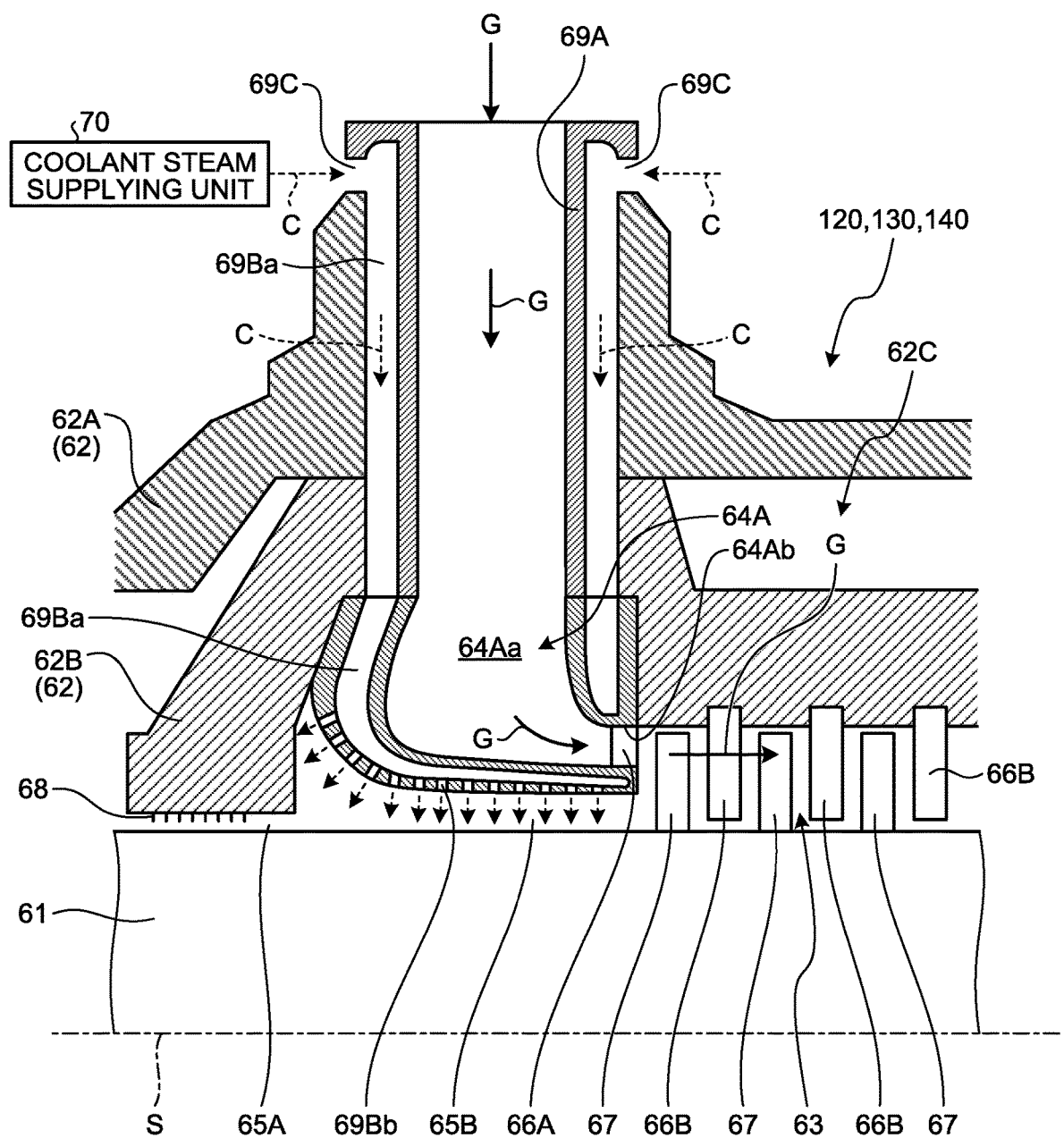
FIG. 3 is a general schematic illustrating an exemplary configuration of the steam turbine cooling unit according to the embodiment of the present invention.

FIGS. 2 and 3 are general schematics illustrating an exemplary configuration of the steam turbine cooling unit according to the embodiment.

Each of the steam turbines 120, 130, 140 includes, as illustrated in FIGS. 2 and 3, a rotor 61, a casing 62, a steam path 63, a steam nozzle unit 64A, turbine vanes 66A, 66B, turbine blades 67, and a superheated steam supply tube 69A.

The rotor 61 is provided to extend along the axial center S of the rotation of the rotor 61.

The casing 62 houses the rotor 61, and supports the rotor 61 in a rotatable manner about the axial center S. The casing 62 includes an outer casing 62A and an inner casing 62B. The outer casing 62A covers the circumference of the inner casing 62B, and houses the inner casing 62B. The inner casing 62B houses the rotor 61, and supports the rotor 61 in a rotatable manner about the axial center S. A casing space 62C is formed between the outer casing 62A and the inner casing 62B. A gap 65A is formed between the inner casing 62B and the outer circumferential surface of the rotor 61. In the gap 65A, a plurality of fins 68 extending from the inner casing 62B toward the rotor 61 and arranged along the direction in which the rotor 61 extends are provided. The fins 68 are applied to a labyrinth seal, a brush seal, or a leaf seal, for example, and prevent fluid from leaking out of the gap 65A.

The steam path 63 is an annular space provided between the rotor 61 and the inner casing 62B along the direction in which the rotor 61 extends.

The steam nozzle unit 64A is attached to the inner casing 62B, with a gap 65B formed on the outer circumference of the inner casing 62B. The gap 65B has an annular shape surrounding the outer circumference of the rotor 61, and is defined by the outer circumferential surfaces of the steam nozzle unit 64A and the rotor 61, and by the inner circumferential surface of the inner casing 62B, and communicates with the steam path 63 and the gap 65A. The steam nozzle unit 64A includes a steam nozzle chamber 64Aa that is formed along the annular internal of the steam nozzle unit 64A, and an opening 64Ab formed to face the extending direction of the rotor 61 from the steam nozzle chamber 64Aa to communicate with the steam path 63.

In the steam nozzle unit 64A, a plurality of nozzle unit turbine vanes 66A are attached to the opening 64Ab on the steam nozzle chamber 64Aa along the annular shape. In the steam path 63, a plurality of steam path turbine vanes 66B are attached to the inner casing 62B, along the annular shape. In the steam path 63, a plurality of the turbine blades 67 are also attached to the outer circumference of the rotor 61 along the annular shape, adjacently to the turbine vanes 66A, 66B.

The superheated steam supply tube 69A is provided to penetrate the casings 62A, 62B from the external of the outer casing 62A and the inner casing 62B to reach and communicate with the steam nozzle chamber 64Aa in the steam nozzle unit 64A. Receiving the supply of superheated steam G having been superheated, the superheated steam supply tube 69A supplies the superheated steam G to the steam path 63 via the steam nozzle unit 64A. In the high-pressure steam turbine 120, the superheated steam supply tube 69A is connected to the connection line 48 illustrated in FIG. 1, and is supplied with the superheated steam G superheated in the secondary high-pressure superheater 25. In the medium-pressure steam turbine 130, the superheated steam supply tube 69A is connected to the connection line 42 illustrated in FIG. 1, and is supplied with the superheated steam G superheated in the secondary reheater 24. In the low-pressure steam turbine 140, the superheated steam supply tube 69A is connected to the connection line 33 illustrated in FIG. 1, and is supplied with the superheated steam G superheated in the low-pressure superheater 17.

Therefore, in the steam turbines 120, 130, 140, the superheated steam G having been superheated is supplied to the steam nozzle chamber 64Aa, discharged to the steam path 63 through the opening 64Ab, and causes the turbine vanes 66A, 66B and the turbine blades 67 to rotate the rotor 61.

For such steam turbines 120, 130, 140, the steam turbine cooling unit according to the embodiment is configured in a manner illustrated in FIGS. 2 and 3.

The steam turbine cooling unit illustrated in FIG. 2 is provided with a coolant steam path 69Ba and a coolant steam supplying unit 70.

The coolant steam path 69Ba is provided to penetrate the casing 62 (the outer casing 62A and the inner casing 62B) along the superheated steam supply tube 69A, and reaches the gap 65B on the outer circumference of the steam nozzle unit 64A. The coolant steam supplying unit 70 supplies the coolant steam C, having a temperature lower than and a pressure higher than those of the superheated steam G that is supplied via the superheated steam supply tube 69A, from the side of the superheated steam supply tube 69A with respect to the coolant steam path 69Ba, into the gap 65B on the outer circumference of the steam nozzle unit 64A.

Specifically, the coolant steam path 69Ba is a space formed between the outer circumferential surface of the superheated steam supply tube 69A and an outer tube 69B having a cylindrical shape and attached to the casing 62 to surround the outer circumference of the superheated steam supply tube 69A. The outer tube 69B includes a base end positioned outside of the outer casing 62A and closed by being connected to the outer circumferential surface of the superheated steam supply tube 69A. A connection port 69C communicating with the coolant steam supplying unit 70 is provided to this position. The outer tube 69B includes a tip portion positioned inside of the inner casing 62B, and the coolant steam path 69Ba opens to the gap 65B that is external of the steam nozzle unit 64A and is internal of the inner casing 62B. In other words, in the steam turbine cooling unit illustrated in FIG. 2, the coolant steam path 69Ba is provided as a double tube 69 including the superheated steam supply tube 69A and the outer tube 69B surrounding the outer circumference of the superheated steam supply tube 69A, and is provided to extend from the external of the outer casing 62A into the internal of the inner casing 62B to communicate with the gap 65B on the outer circumference of the steam nozzle unit 64A.

For the high-pressure steam turbine 120, the section from the outlet of the high-pressure evaporator 21 (the high-pressure drum 20) through the primary high-pressure superheater 22 to the internal of the secondary high-pressure superheater 25 in the combined-cycle plant 100 serves as a supply source of the coolant steam supplying unit 70, and the supply source is connected to the coolant steam path 69Ba via a connection line (not illustrated). The superheated steam G to be supplied to the high-pressure steam turbine 120 goes out of the secondary high-pressure superheater 25 and passes through the connection line 48. While the superheated steam G flows through the connection line 48, the pressure of the superheated steam G drops. Therefore, the steam in the section from the outlet of the high-pressure evaporator 21 through the primary high-pressure superheater 22 to the internal of the secondary high-pressure superheater 25 has a higher pressure and a lower temperature, compared with those of the superheated steam G supplied to the high-pressure steam turbine 120. Therefore, such steam can be supplied to the internal of the high-pressure steam turbine 120, as the coolant steam C having a pressure higher than and a temperature lower than those of the superheated steam G to be supplied to the internal of the high-pressure steam turbine 120.

For the medium-pressure steam turbine 130, the section from the outlet of the medium-pressure evaporator 16 (the medium-pressure drum 15) through the medium-pressure superheater 19 and the primary reheater 23 to the internal of the secondary reheater 24 in the combined-cycle plant 100 serves as the supply source of the coolant steam supplying unit 70, and the supply source is connected to the coolant steam path 69Ba via a connection line (not illustrated). The superheated steam G to be supplied to the medium-pressure steam turbine 130 goes out of the secondary reheater 24 and passed through the connection line 42. While the superheated steam G flows through the connection line 42, the pressure of the superheated steam G drops. Therefore, the steam in the section from the outlet of the medium-pressure evaporator 16 through the medium-pressure superheater 19 and the primary reheater 23 to the internal of the secondary reheater 24 has a higher pressure and a lower temperature, compared with those of the superheated steam G supplied to the medium-pressure steam turbine 130. Therefore, such steam can be supplied to the internal of the medium-pressure steam turbine 130 as the coolant steam C having a pressure higher than and a temperature lower than those of the superheated steam G to be supplied to the internal of the medium-pressure steam turbine 130.

For the low-pressure steam turbine 140, the section from the outlet of the low-pressure evaporator 12 (the low-pressure drum 11) to the internal of the low-pressure superheater 17 in the combined-cycle plant 100 serves as the supply source of the coolant steam supplying unit 70, and the supply source is connected to the coolant steam path 69Ba via a connection line (not illustrated). The superheated steam G to be supplied to the low-pressure steam turbine 140 goes out of the low-pressure superheater 17 and passes through the connection line 33. While the superheated steam G flows through the connection line 33, the pressure of the superheated steam G drops. Therefore, the steam in the section from the outlet of the low-pressure evaporator 12 to the internal of the low-pressure superheater 17 has a higher pressure and a lower temperature, compared with the superheated steam G supplied to the low-pressure steam turbine 140. Therefore, such steam can be supplied to the internal of the low-pressure steam turbine 140 as the coolant steam C having a pressure higher than and a temperature lower than those of the superheated steam G to be supplied to the internal of the low-pressure steam turbine 140.

In this manner, the steam turbine cooling unit illustrated in FIG. 2 includes the coolant steam path 69Ba that is provided to penetrate the casing 62 along the superheated steam supply tube 69A to reach the gap 65B, and the coolant steam supplying unit 70 that supplies the coolant steam C flowing through the coolant steam path 69Ba along the superheated steam supply tube 69A and reaching the gap 65B, and having a pressure higher than and a temperature lower than those of the superheated steam G to be supplied by the superheated steam supply tube 69A.

The superheated steam G supplied by the superheated steam supply tube 69A flows out of the steam nozzle chamber 64Aa in the steam nozzle unit 64A, passes through the opening 64Ab, and reaches the steam path 63. The temperature and the pressure of the superheated steam G drop gradually from the upstream toward the downstream of this steam flow. By contrast, the coolant steam C flows through the coolant steam path 69Ba along the superheated steam supply tube 69A and reaches the gap 65B, that is, flows from a high-temperature section toward a low-temperature section, in a manner following the temperature of the superheated steam G. Therefore, the coolant steam C can cool the high-temperature section more reliably. In addition, because the coolant steam C flowing out of the gap 65B and reaching the steam path 63 is heated to a temperature near the temperature of the superheated steam G, and is merged with the superheated steam G, a reduction in the performance of the steam turbines 120, 130, 140 can be suppressed. Furthermore, because the coolant steam C follows a continuous channel without being distributed to a plurality of channels, the flowrate can be controlled easily in the process of cooling.

Furthermore, in the steam turbine cooling unit illustrated in FIG. 2, because the coolant steam path 69Ba is provided as a space formed between the outer circumferential surface of the superheated steam supply tube 69A and the outer tube 69B attached to the casing 62 to surround the outer circumference of the superheated steam supply tube 69A, and because the coolant steam path 69Ba is provided to extend from the external of the casing 62 (the outer casing 62A) into the internal of the casing 62 (the inner casing 62B) to communicate with the gap 65B, a channel penetrating the casing 62 along the superheated steam supply tube 69A and reaching the gap 65B can be achieved.

A steam turbine cooling unit illustrated in FIG. 3 includes the coolant steam path 69Ba and the coolant steam supplying unit 70.

The coolant steam path 69Ba is provided to penetrate the casing 62 (the outer casing 62A and the inner casing 62B) along the superheated steam supply tube 69A to reach the gap 65B on the outer circumference of the steam nozzle unit 64A. Furthermore, the coolant steam supplying unit 70 supplies the coolant steam C, having a temperature lower than and a pressure higher than those of the superheated steam G that is supplied via the superheated steam supply tube 69A, from the side of the superheated steam supply tube 69A with respect to the coolant steam path 69Ba, into the gap 65B on the outer circumference of the steam nozzle unit 64A.

Specifically, the coolant steam path 69Ba includes a space formed between the outer circumferential surface of the superheated steam supply tube 69A and the casing 62 (the outer casing 62A and the inner casing 62B), a cavity that is provided inside of the wall of the steam nozzle unit 64A to communicate with the space, and penetrating holes 69Bb penetrating from the cavity into the gap 65B. In such a case, the coolant steam path 69Ba, which is the space, is formed between the outer circumferential surface of the superheated steam supply tube 69A and the casing 62 across a section where the superheated steam supply tube 69A penetrates casing 62, and the outer casing 62A and the inner casing 62B are connected across this section without any gap therebetween. Furthermore, the coolant steam path 69Ba, which is the space, has a base end that is positioned outside of the outer casing 62A, and that is closed, and the connection port 69C communicating with the coolant steam supplying unit 70 is provided to the position. The coolant steam path 69Ba, which is the cavity, communicates with the space. The coolant steam path 69Ba, which is the cavity, is provided with the penetrating holes 69Bb penetrating the external circumferential surface of the steam nozzle unit 64A, the external circumferential surface being positioned inside the gap 65B, and is provided to open to the gap 65B that is external of the steam nozzle unit 64A and internal of the inner casing 62B, via the penetrating holes 69Bb. In other words, in the steam turbine cooling unit illustrated in FIG. 3, the coolant steam path 69Ba is configured to extend along the outer circumferential surface of the superheated steam supply tube 69A to communicate with the internal of the wall of the steam nozzle unit 64A, and is provided to extend from the external of the outer casing 62A into the internal of the inner casing 62B to communicate with the gap 65B on the outer circumference of the steam nozzle unit 64A via the penetrating holes 69Bb.

As described above, as the coolant steam supplying unit 70, the supply source in each of the high-pressure steam turbine 120, the medium-pressure steam turbine 130, the low-pressure steam turbine 140 in the combined-cycle plant 100 is connected to the coolant steam path 69Ba via a connection line (not illustrated).

In the manner described above, the steam turbine cooling unit illustrated in FIG. 3 includes the coolant steam path 69Ba that is provided to penetrate the casing 62 along the superheated steam supply tube 69A to reach the gap 65B, and the coolant steam supplying unit 70 that supplies the coolant steam C flowing through the coolant steam path 69Ba along the superheated steam supply tube 69A and reaching the gap 65B, and having a pressure higher than and a temperature lower than those of the superheated steam G to be supplied by the superheated steam supply tube 69A.

The superheated steam G supplied by the superheated steam supply tube 69A flows out of the steam nozzle chamber 64Aa in the steam nozzle unit 64A, passes through the opening 64Ab, and reaches the steam path 63. The temperature and the pressure of the superheated steam G drop gradually from the upstream toward the downstream of this steam flow. By contrast, the coolant steam C flows through the coolant steam path 69Ba along the superheated steam supply tube 69A and reaches the gap 65B, that is, flows from a high-temperature section toward a low-temperature section, in a manner following the temperature of the superheated steam G. Therefore, the coolant steam C can cool the high-temperature section more reliably. In addition, because the coolant steam C flowing out of the gap 65B and reaching the steam path 63 is heated to a temperature near the temperature of the superheated steam G before being merged with the superheated steam G, a reduction in the performance of the steam turbines 120, 130, 140 can be suppressed. Furthermore, because the coolant steam C follows a continuing channel without being distributed to a plurality of channels, the flowrate can be controlled easily in the process of cooling.

Furthermore, in the steam turbine cooling unit illustrated in FIG. 3, the coolant steam path 69Ba includes the space formed between the outer circumferential surface of the superheated steam supply tube 69A and the casing 62 (the outer casing 62A and the inner casing 62B), the cavity that is provided inside of the wall of the steam nozzle unit 64A to communicate with the space, and the penetrating holes 69Bb penetrating from the cavity into the gap 65B, and the coolant steam path 69Ba is provided to extend from the external of the casing 62 (the outer casing 62A) to the internal of the casing 62 (the inner casing 62B) to communicate with the gap 65B. In this manner, a channel penetrating the casing 62 along the superheated steam supply tube 69A and reaching the gap 65B can be achieved. In addition, with the steam turbine cooling unit illustrated in FIG. 3, because the coolant steam path 69Ba is provided as the space formed between the outer circumferential surface of the superheated steam supply tube 69A and the casing 62 (the outer casing 62A and the inner casing 62B), the double tube 69 for forming the outer tube 69B on the outer side of the superheated steam supply tube 69A is not required, as do in the steam turbine cooling unit illustrated in FIG. 2. Furthermore, because the steam nozzle unit 64A is cooled inside from the cavity, the cooling efficiency can be improved, compared with a configuration in which the steam nozzle unit 64A is cooled from the surface. Furthermore, by providing a nozzle-like shape to the penetrating holes 69Bb, the rotor 61 can be cooled more effectively by spraying the coolant steam C against the rotor 61.

The steam turbine cooling unit according to the embodiment can supply the coolant steam C having a pressure higher than and a temperature lower than those of the superheated steam G to be supplied to the steam turbines 120, 130, 140, to the internal of the steam turbines 120, 130, 140, in the combined-cycle plant 100. As a result, a high-temperature section inside of the steam turbines 120, 130, 140 can be cooled, without requiring any other power source. Furthermore, because the steam generated in the combined-cycle plant 100 is used, but any fluid inside of the steam turbines 120, 130, 140 is used, it is possible to prevent the operation efficiency of the steam turbines 120, 130, 140 from deteriorating, and as a result, it is possible to prevent the cycle efficiency from deteriorating.

In the steam turbine cooling unit according to the embodiment, as the coolant steam supplying unit 70 that supplies the coolant steam C, it is preferable, for the high-pressure steam turbine 120, to use the section from the outlet of the primary high-pressure superheater 22 to the inlet of the secondary high-pressure superheater 25 as the supply source, and to connect the supply source to the coolant steam path 69Ba via a connection line (not illustrated). If the coolant steam C is supplied to the internal of the high-pressure steam turbine 120 from the connection line 47 between the outlet of the primary high-pressure superheater 22 and the inlet of the secondary high-pressure superheater 25, the steam to be supplied to the secondary high-pressure superheater 25 becomes reduced. Therefore, the superheating efficiency in the secondary high-pressure superheater 25 is improved, and the temperature of the superheated steam G to be supplied to the high-pressure steam turbine 120 is increased. As a result, the operation efficiency of the high-pressure steam turbine 120 can be improved, so that the cycle efficiency can be improved. If the coolant steam C is supplied to the internal of the high-pressure steam turbine 120 from the connection line 47 between the outlet of the primary high-pressure superheater 22 and the inlet of the secondary high-pressure superheater 25, by setting the temperature of the superheated steam G to be supplied to the high-pressure steam turbine 120 constant, the amount of steam acquired from the high-pressure evaporator 21 can be increased. Therefore, the amount of superheated steam G to be supplied to the high-pressure steam turbine 120 can be increased. As a result, the operation efficiency of the high-pressure steam turbine 120 can be improved, so that the cycle efficiency can be improved.

Furthermore, in the steam turbine cooling unit according to the embodiment, as the coolant steam supplying unit 70 that supplies the coolant steam C, it is preferable, for the medium-pressure steam turbine 130, to use the section from the outlet of the medium-pressure superheater 19 to the inlet of the primary reheater 23 as the supply source, and to connect the supply source to the coolant steam path 69Ba via a connection line (not illustrated). If the coolant steam C is supplied to the internal of the medium-pressure steam turbine 130 from the connection line 38 (and a part of the connection line 40) connecting the outlet of the medium-pressure superheater 19 and the inlet of the primary reheater 23, the steam to be supplied to the primary reheater 23 and the secondary reheater 24 becomes reduced. Therefore, the superheating efficiency in the primary reheater 23 and the secondary reheater 24 is improved, and the temperature of the superheated steam G to be supplied to the medium-pressure steam turbine 130 is increased. As a result, the operation efficiency of the medium-pressure steam turbine 130 can be improved, so that the cycle efficiency can be improved. If the coolant steam C is supplied to the internal of the medium-pressure steam turbine 130 from the connection line 38 (and a part of the connection line 40) connecting the outlet of the medium-pressure superheater 19 and the inlet of the primary reheater 23, by setting the temperature of the superheated steam G to be supplied to the medium-pressure steam turbine 130 constant, the amount of steam acquired from the medium-pressure evaporator 16 can be increased. Therefore, the amount of superheated steam G to be supplied to the medium-pressure steam turbine 130 can be increased. As a result, the operation efficiency of the medium-pressure steam turbine 130 can be improved, so that the cycle efficiency can be improved.

Furthermore, in the steam turbine cooling unit according to the embodiment, as the coolant steam supplying unit 70 that supplies the coolant steam C, it is preferable, for the medium-pressure steam turbine 130, to use the section from the outlet of the primary reheater 23 to the inlet of the secondary reheater 24 as the supply source, and to connect the supply source to the coolant steam path 69Ba via a connection line (not illustrated). If the coolant steam C is supplied to the internal of the medium-pressure steam turbine 130 from the connection line 41 between the outlet of the primary reheater 23 and the inlet of the secondary reheater 24, the steam to be supplied to the secondary reheater 24 becomes reduced. Therefore, the superheating efficiency in the secondary reheater 24 is improved, and the temperature of the superheated steam G to be supplied to the medium-pressure steam turbine 130 is increased. As a result, the operation efficiency of the medium-pressure steam turbine 130 can be improved, so that the cycle efficiency can be improved. If the coolant steam C is supplied to the internal of the medium-pressure steam turbine 130 from the connection line 41 between the outlet of the primary reheater 23 to the inlet of the secondary reheater 24, by setting the temperature of the superheated steam G to be supplied to the medium-pressure steam turbine 130 constant, the amount of steam acquired from the medium-pressure evaporator 16 can be increased. Therefore, the amount of superheated steam G to be supplied to the medium-pressure steam turbine 130 can be increased. As a result, the operation efficiency of the medium-pressure steam turbine 130 can be improved, so that the cycle efficiency can be improved.

Furthermore, in the steam turbine cooling unit according to the embodiment, as the coolant steam supplying unit 70 that supplies the coolant steam C, it is preferable, for the low-pressure steam turbine 140, to use the section from the outlet of the low-pressure evaporator 12 to the inlet of the low-pressure superheater 17 as the supply source, and to connect the supply source to the coolant steam path 69Ba via a connection line (not illustrated). If the coolant steam C is supplied to the internal of the low-pressure steam turbine 140 from the connection line 32 between the outlet of the low-pressure evaporator 12 and the inlet of the low-pressure superheater 17, the steam to be supplied to the low-pressure superheater 17 becomes reduced. Therefore, the superheating efficiency in the low-pressure superheater 17 is improved, and the temperature of the superheated steam G to be supplied to the low-pressure steam turbine 140 is increased. As a result, the operation efficiency of the low-pressure steam turbine 140 can be improved, so that the cycle efficiency can be improved. If the coolant steam C is supplied to the internal of the low-pressure steam turbine 140 from the connection line 32 between the outlet of the low-pressure evaporator 12 and the inlet of the low-pressure superheater 17, by setting the temperature of the superheated steam G to be supplied to the low-pressure steam turbine 140 constant, the amount of steam acquired from the low-pressure evaporator 12 can be increased. Therefore, the amount of superheated steam G to be supplied to the low-pressure steam turbine 140 can be increased. As a result, the operation efficiency of the low-pressure steam turbine 140 can be improved, so that the cycle efficiency can be improved.

REFERENCE SIGNS LIST 1 steam generator
10 low-pressure economizer
11 low-pressure drum
12 low-pressure evaporator
13 medium-pressure economizer
14 primary high-pressure economizer
15 medium-pressure drum
16 medium-pressure evaporator
17 low-pressure superheater
18 secondary high-pressure economizer
19 medium-pressure superheater
20 high-pressure drum
21 high-pressure evaporator
22 primary high-pressure superheater
23 primary reheater
24 secondary reheater
25 secondary high-pressure superheater
26 condensate pump
27 medium-pressure feedwater pump
28 high-pressure feedwater pump
30 connection line
31 connection line
31a low-pressure branch line
31b medium-pressure branch line
31c high-pressure branch line
32 connection line
33 connection line
34 connection line
35 connection line
36 flow regulator valve
37 connection line
38 connection line
39 connection line
40 connection line
41 connection line
42 connection line
43 connection line
44 connection line
45 flow regulator valve
46 connection line
47 connection line
48 connection line
61 rotor
62 casing
62A outer casing
62B inner casing
62C casing space
63 steam path
64A steam nozzle unit
64Aa steam nozzle chamber
64Ab opening
65A gap
65B gap
66A nozzle turbine vanes
66B steam path turbine vane 67 turbine blade
68 fin
69 double tube
69A superheated steam supply tube
69B outer tube
69Ba coolant steam path
69Bb penetrating hole
69C connection port
70 coolant steam supplying unit
100 combined-cycle plant
110 gas turbine
111 compressor
112 combustor
113 turbine
113a flue gas duct
114 incoming compressor air
115 fuel
120 high-pressure steam turbine
130 medium-pressure steam turbine
140 low-pressure steam turbine
150 generator
160 condenser
C coolant steam
G superheated steam
S axial center

The invention claimed is:

1. A steam turbine cooling unit for a steam turbine that includes a rotor which is a rotatable body extending along an axial center of rotation of the rotor, a casing configured to house the rotor, a steam path defined between the rotor and the casing in an extending direction of the rotor, a steam nozzle unit attached to the casing with a gap defined between an outer surface of the steam nozzle unit and an outer circumferential surface of the rotor, the gap having an annular shape surrounding the outer circumference of the rotor and being in communication with the steam path, the steam nozzle unit including a steam nozzle chamber having an annular shape defined inside the steam nozzle unit and an opening facing the extending direction of the rotor from the steam nozzle chamber to communicate with the steam path, and a superheated steam supply tube configured to receive superheated steam, the superheated steam supply tube penetrating the casing from outside the casing to communicate with the steam nozzle chamber in the steam nozzle unit, the steam turbine cooling unit comprising:
 a coolant steam path penetrating the casing along the superheated steam supply tube to reach the gap; and
 a coolant steam supplying unit configured to supply coolant steam flowing through the coolant steam path along the superheated steam supply tube to reach the gap, the coolant steam having: (i) a pressure higher than a pressure of steam to be supplied by the superheated steam supply tube; and (ii) a temperature lower than a temperature of the steam to be supplied by the superheated steam supply tube, wherein the coolant steam path includes:
 a passage with an inner wall and an outer wall, the inner wall of the passage being an outer wall of the superheated steam supply tube and the outer wall of the passage being an inner wall of the casing;
 a cavity defined inside of a wall of the steam nozzle unit to communicate with the passage; and
 a penetrating hole penetrating from the cavity into the gap, wherein:
the coolant steam path extends from outside the casing to inside the casing to communicate with the gap,
the steam nozzle unit includes a first wall for partitioning the steam nozzle unit into the steam nozzle chamber and the cavity, and a second wall for defining the cavity with the first wall, the first wall being connected to the outer wall of the superheated steam supply tube;
the second wall extends from the inner wall of the casing; and
the penetrating hole is defined in the second wall.

2. The steam turbine cooling unit of claim 1, wherein at least a portion of the outer wall of the superheated steam supply tube is parallel to the inner wall of the casing.

* * * * *